United States Patent [19]

Wünstel

[11] 4,294,388
[45] Oct. 13, 1981

[54] CAR TOP CARRIER SUPPORT

[76] Inventor: Franz Wünstel, Morellstr. 1, D-8900 Augsburg, Fed. Rep. of Germany

[21] Appl. No.: 177,445

[22] Filed: Aug. 11, 1980

[51] Int. Cl.³ .............................................. B60M 9/04
[52] U.S. Cl. .................................. 224/315; 224/322; 224/331
[58] Field of Search ............... 224/315, 309, 322, 329, 224/331; 248/226.1; 269/42, 105, 107, 108, 109, 121, 153, 157, 218

[56] References Cited

U.S. PATENT DOCUMENTS

| | | | |
|---|---|---|---|
| 2,480,353 | 8/1949 | Bjork | 224/315 X |
| 2,528,794 | 11/1950 | Seidler | 224/331 X |
| 2,833,453 | 5/1958 | Barreca | 224/315 |
| 3,888,398 | 6/1975 | Payne | 224/315 X |
| 4,047,710 | 9/1977 | Wilson | 269/42 |
| 4,101,061 | 7/1978 | Sage et al. | 224/322 |

Primary Examiner—Steven M. Pollard
Attorney, Agent, or Firm—Haseltine and Lake

[57] ABSTRACT

A car top carrier support which is operable for use on the gutters of a car top as well as on a gutterless car top including ledges at its opposite sides. The carrier support comprises a H-shaped frame with one longitudinal main tube and at least a pair of cross tubes. A central operating mechanism is mounted in the main tube and connected by four Bowden cables with four claws which are movably guided in legs fastened at the cross tubes for clamping the carrier support at the car top. By swinging only one hand lever of the central operating mechanism between two positions the carrier support is free to be removed from the car top. A key-operated locking device co-operating with the central operating mechanism provides a theftproof arrangement. Wire cables fastened at securing pins can be turned around articles on the carrier support and the pins can be locked in a theftproof way by the same central operating mechanism.

10 Claims, 7 Drawing Figures

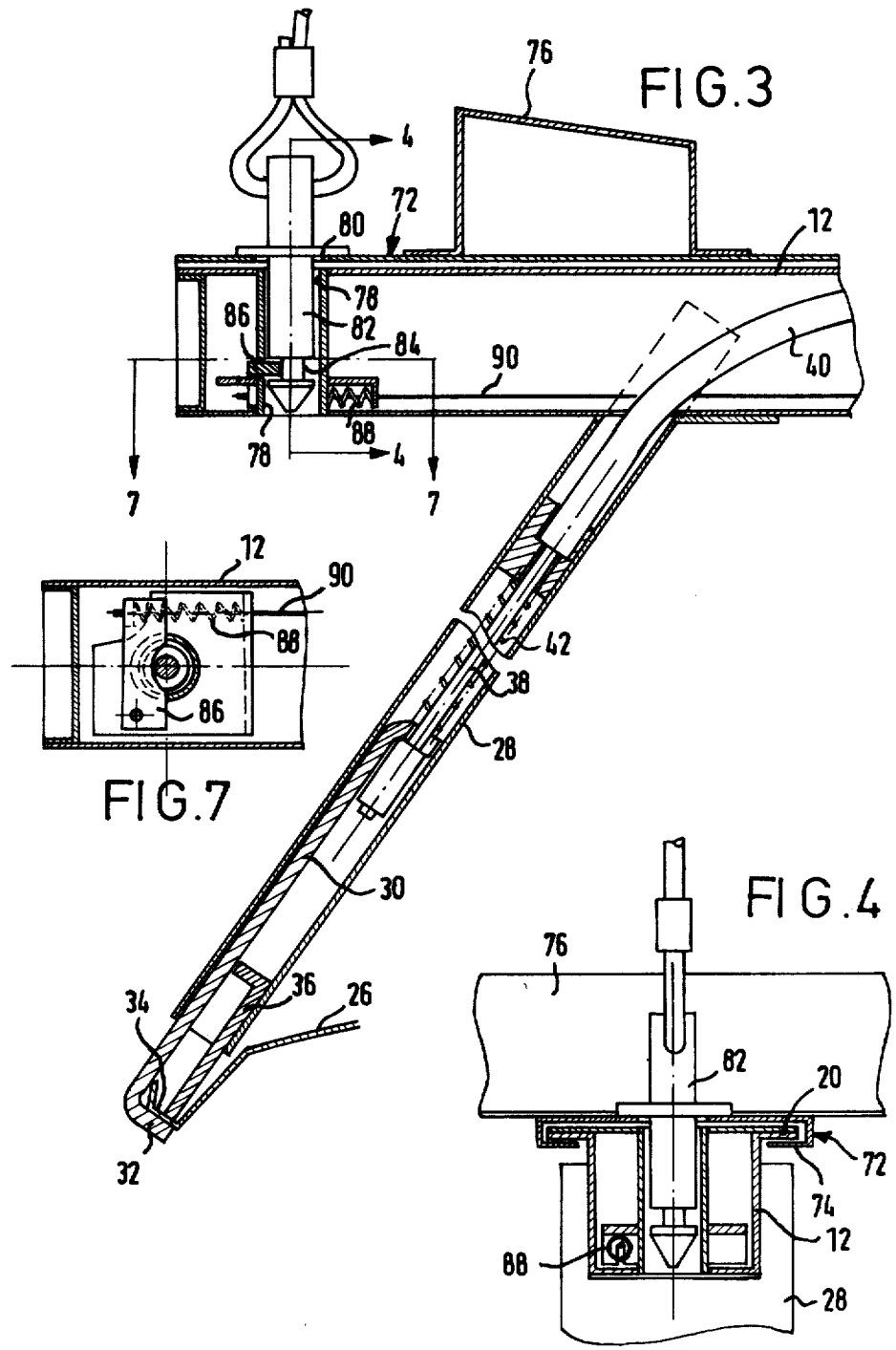

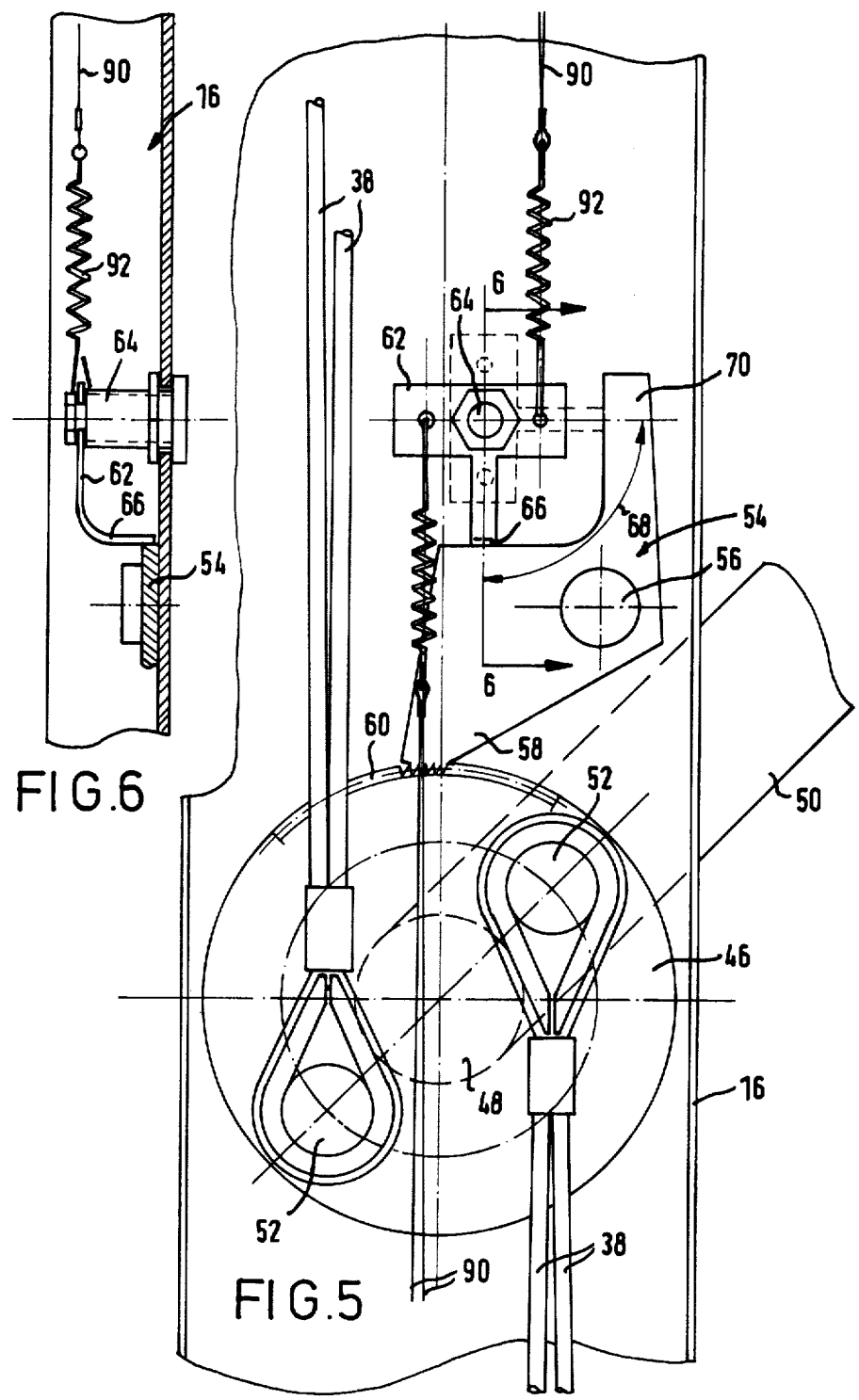

CAR TOP CARRIER SUPPORT

BACKGROUND OF THE INVENTION

1. Field of the Invention

The present invention relates to a car top carrier and particularly one that can be locked and unlocked by only one hand operation procedure at only one central operating station. The present invention may be used as a mounting for any form of changeable supports for different articles as boats, containers, cycles and the like.

2. Description of the Prior Art

Numerous car top constructions are known in the prior art but none which allows for a central operation of at least four clamping devices for clamping the carrier support on the car top and for a simple theftproof central locking device.

Representative of the prior art is the U.S. Pat. No. 4,101,061 Sage et al. This patent illustrates a cross tube having vertical legs at its ends, the legs being fastened at tube-shaped slides which can be moved telescopically in the cross tube by a crankshaft arrangement. The legs are provided with claws which engage the lower faces of the car top ledges when the slides are moved into the cross tube. At least two of such cross tubes must separately be fastened on the car top.

BRIEF SUMMARY OF THE INVENTION

The present invention is a car top carrier support device which is operable for use on either a gutterless or a conventionally guttered car top, requiring only that the roof has ledges on opposite sides thereof.

According to one embodiment, there is a frame consisting of at least three hollow tubes, a pair of parallel tubes and a rectangularly extending connecting tube. Near the ends of the parallel tubes downwardly extending tube-like legs are fastened in which slides are guided for a reciprocating motion. The lower ends of the slides form clamping claws. Each one of the at least four slides is connected with a cable. All cables run within the legs and hollow tubes and are connected with a central operating mechanism which is arranged in one of said hollow tubes. The slides are spring-loaded into the opening positions of their claws and when the central operating mechanism is operated all clamping claws are moved simultaneously. The central operating mechanism according to a further embodiment is provided with a locking device within one of said hollow tubes in order to achieve a theftproof construction.

One object of the invention is the provision for a car top carrier support which can easily be fastened and detached by only operating one central operating mechanism.

A further object of the invention is to provide a carrier support which can be locked centrally in the working position.

A still further object of the invention is to provide a theftproof construction for the support carrier or for the support carrier and the articles mounted on the carrier. Other objects and advantages of the present invention will become more apparent from the detailed description which follows wherein reference is made to the accompanying drawings.

BRIEF DESCRIPTION OF THE DRAWINGS

FIG. 3 is a vertical section view of the left end of the embodiment of FIG. 1 in larger scale and additionally provided with a slide and a locking mechanism therefore;

FIG. 4 is a sectional view taken along line 4—4 of FIG. 3;

FIG. 5 is a horizontal sectional view of the central operating station in a larger scale; and FIG. 6 is a sectional view taken along line 6—6 of FIG. 5.

FIG. 7 is a sectional view taken along line 7—7 of FIG. 3.

DESCRIPTION OF THE PREFERRED EMBODIMENTS

Figure 1:
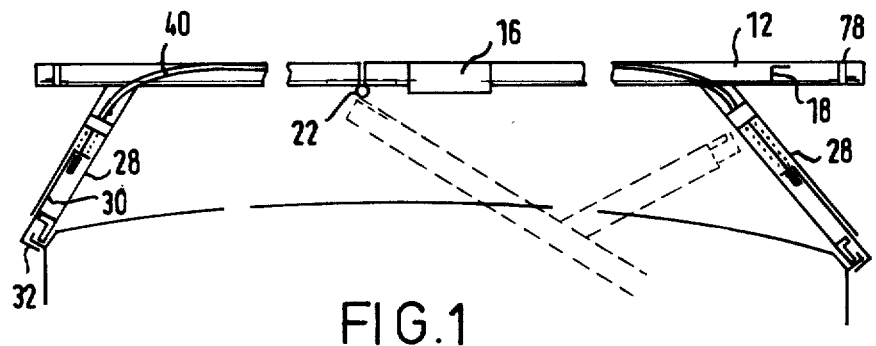
FIG. 1 is a front view of a preferred embodiment of the present invention.

The preferred embodiment comprises a frame 10 consisting of a pair of cross tubes 12, 14, a main longitudinal tube 16, an auxiliary longitudinal tube 18. The tubes are substantially of rectangular cross-section but the cross tubes 12, 14 additionally have upper outer flanges 20. The cross tubes 12, 14 are fastened at the front faces of the longitudinal tubes 16, 18 such that the main tube 16 lies on one side of the longitudinal centreline of the frame and the auxiliary tube 18 lies on the other side of which. Each of the cross tubes 12, 14 and each of the longitudinal tubes 16, 18 are made of two parts connected by hinge joints 22 and 24 respectively. Therefore the frame 10 is collapsible when not used but forms a rigid structure when mounted on a car top 26.

Spaced from the ends of each cross tube 12, 14 an inclined downwardly extending tube-shaped leg 28 is fastened at the cross tube respectively. In each of the legs 28 a slide 30 is movably guided in lengthwise direction of the legs. The lower end of each slide is inwardly bent and forms a claw 32 gripping under the gutter 34 of the car top when a foot bar 36 protruding downwards from and fastened at the leg stands on that gutter. It should be evident that in case of a gutterless car top instead of the foot bar 36 a foot pad is used resting on the car top itself.

Each slide 30 is connected with a pull wire 38 of a Bowden cable 40 and a compression spring 42 presses against the upper bent of the slide 30 and therefore urges slide 30 downwardly in the open position of the claw 32. Each of the four Bowden-cables 40 runs through an opening provided in the bottom wall of the cross tubes 12, 14 connecting the interior of the leg with that of the cross tube into the cross tube and further runs through an opening provided in the side wall of each cross tube into the interior of the main longitudinal tube 16. The tubes are closed at their ends and no portion of the Bowden cables is accessible from the outside.

Figure 2:
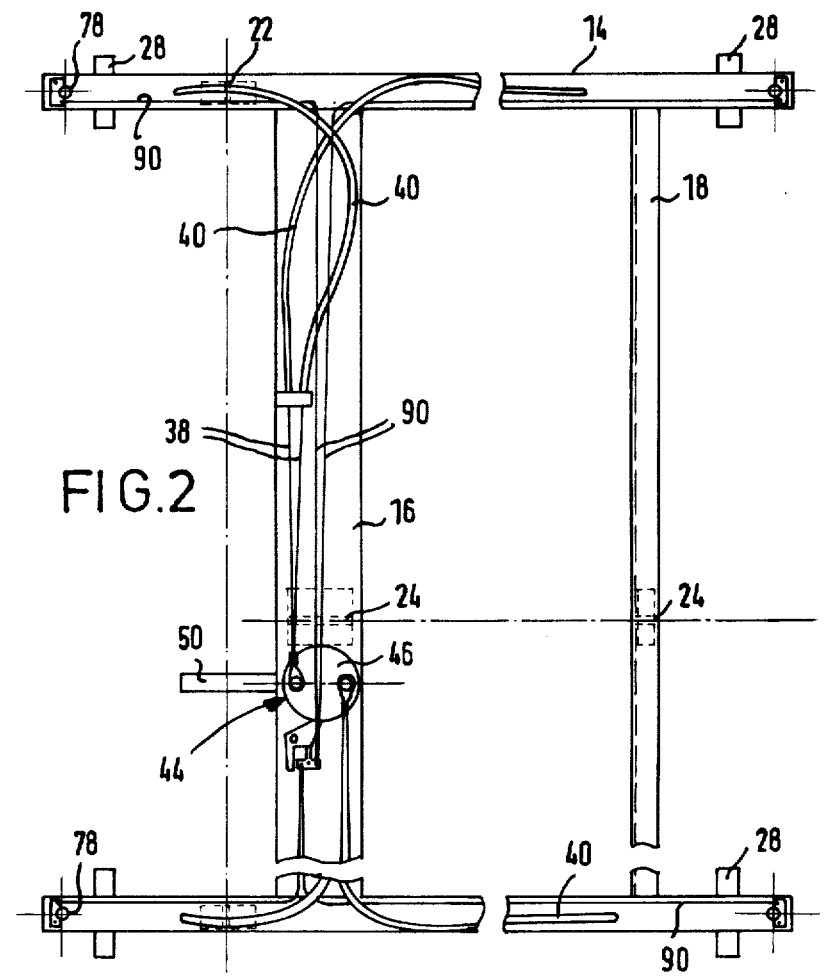
FIG. 2 is a plan view of the embodiment of FIG. 1, illustrating structural components in partial cross-section.

Substantially in the middle of the main tube 16 a central operating mechanism 44 is mounted within the main tube and consists of a disc 46 fastened on a shaft 48 rotatably mounted in the upper and lower walls of the main tube. The shaft protrudes downwardly and carries a handle 50. The disc is provided with a pair of pins 52 oppositely arranged with respect to the rotating axis. The pull wires 38 of the Bowden cables 40 of the one cross tube are fastened at the one pin 52 and the other pair of pull wires are fastened at the other pin. The handle 50 in the open-position of the clamping claws 32 lies substantially aligned with the main tube, that means downwardly in FIG. 5. If the handle 50 is swung around about substantially 135 degrees in counterclockwise direction (FIG. 5) the claws 32 are drawn tightly against the gutter 34 and the carrier frame 10 is securely fixed on the car top (FIG. 5). FIG. 2 shows an intermediate position during the swinging movement of the handle 50.

Although the operating mechanism 44 can be made self-locking—the pins 52 must only run beyond the longitudinal centre-line—a locking mechanism is provided, consisting of a double-armed pawl 54, which is pivoted on a pin 56 and the one arm 58 of which is toothed and engages with a toothed portion 60 of the circumference of the disc 46 in the clamping position. The pawl 54 is actuated by a turn plate 62 fastened on a cylinder lock block 64 which is rotatably mounted on a bottom plate fastened at the bottom wall of the main tube 16. The lock block can be rotated about 90 degrees by means of a key inserted from below. The turn plate 62 has a downwardly bent springy protrusion or bow 66 which urges the one arm 58 of the pawl into engagement with the circumference of the disc 46. In this position the key can be drawn off. Due to the spring effect of the bow 66 the turn plate 62 can be rotated into its locking position while the disc 46 still is in the non-tensioned position. The pawl then rests on the non-toothed circumference of the disc and the key can be drawn off. Then the handle 50 can be swung around and when the clamping effect of the clamping claws 32 will be sufficient, the disc 46 is locked by the pawl 58 which is resiliently urged into engagement with the toothed portion 60 of the disc. It is an advantage that there is no predetermined tensioning position of the disc because alterations of the Bowden cables have no detrimental influence on the correct operation of the mechanism.

In order to open the clamping claws 32 the inserted key must be turned, rotating the turn plate 62 and the bow 66 of which along arrow 68 into the position shown by dotted lines in FIG. 5. The other arm 70 of the pawl has a smaller space from the rotation axis of the bow 66 than the one arm 58. Therefore the bow 66 pivots the pawl about a small angle when urging against the other arm 70. The pawl comes out of engagement with the disc and the springs 42 in the legs 28 draw the disc 46 into its "open-position".

As mentioned at the beginning the cross tubes 12, 14 have outer flanges 20 which provide a slide guide for detachable slide bodies 72 which can be pushed on to the outer ends of the cross tubes 12, 14. The slide bodies are substantially of U-shaped cross-section but having inwardly extending webs 74 gripping under the flanges 20 of the cross tube. On the slide bodies are fastened mountings 76 which are adapted to various articles as boats, cycles and the like. A pair of slide bodies 72 can be connected by a longitudinal profile bar and such an arrangement as a whole can be pushed on the ends of the pair of cross tubes 12, 14.

Near each end of the cross tubes 12, 14 a pair of bores 78 is provided in the upper and lower wall and a sleeve extends downwardly in the cross tube between the bores 78. The upper wall of each slide body 72 also has a bore 80. When the bores 78, 80 are aligned a securing pin 82 can be inserted from above which has a groove 84 into which a latch plate 86 can engage for locking the pin 82 in the operation position. The latch plate is pivoted in the tube and urged into its unlocking position by a spring 88.

Each latch plate 86 is connected with a pull wire of a Bowden cable 90. The four Bowden cables 90 run to the central operating mechanism 44 and the pull wires of which in pairs are connected with a spring 92. The other ends of the pair of springs 92, 92 are fastened at the turn plate 62 in holes which lie oppositely with respect to the axis. The pair of holes are substantially aligned with the longitudinal direction of the main tube 16 when the turn plate is in the open position, shown with dashes in FIG. 5. Then the latch plates allow the securing pins 82 to be removed. When the turn plate 62 is rotated into its locking position the Bowden cables draw the latch plates into their locking positions and the securing pins 82 cannot be removed.

The securing pins 82 have two functions. They hold the slide bodies in a theftproof manner in place and are connected with a securing steel cable which can tightly be wound around articles or can loosely be wound through openings of such articles to be transported on the car top, thereby providing a theftproof for such articles. It is to be understood that the other ends of the steel cables are firmly fastened at the slide bodies or at other securing pins 82.

In the foregoing description slide profiles are mentioned but it should be evident, that instead of that profiles can be used which can be hooked over the cross tubes and locked by the securing pins.

Instead of Bowden cables 90 simple steel cables can be used as shown in the drawings.

I claim:

1. A car top carrier support comprising a substantially H-shaped frame, the frame consisting of a pair of parallel hollow tubes and at least one hollow tube crosswise extending therebetween, at least four legs arranged at the frame and extending downwardly, the legs standing on the car top edge or the gutter of which, a claw associated with each leg and connected with a slide, the slide being movably guided in the leg for a reciprocating motion; a central hand operating means arranged at the frame and a set of at least four driving means, each one of the driving means being connected at its one end with one of the claws and at its other end with the central operating means.

2. A car top carrier support as claimed in claim 1, wherein each slide is connected with the pull wire of a Bowden cable, a spring is mounted within each leg forcing the slide downwardly into an open position of the claw, the central operating means consists of a rotatable shaft having an operating handle at the outside of one of said hollow tubes and carrying a disc or the like within said tube and wherein the pull wires of the four Bowden cables run within said tubes and are connected directly or by a connecting means with the disc at opposite places of which with respect to the shaft axis.

3. A car top carrier support as claimed in claim 2, wherein a theftproof locking mechanism is provided within said one tube co-operating with the shaft or the disc of which and securing the shaft in the off-position.

4. A car top carrier support as claimed in claim 3, wherein the disc has a toothed portion at its outer circumference and a double-armed pawl is pivoted in the one tube; the pawl having a locking position in which it engages the toothed portion of the disc and can be turned by a small angle into an unlocking position and wherein a key-operated turn plate is mounted in said one tube provided with a locking arm, which in one pivot position of the turn plate contacts one arm of the pawl and holds the pawl in the locking position and which in a second pivot position pushes against the other arm of the pawl and holds the pawl out of its engagement with the disc.

5. A car top carrier support as claimed in claim 4, wherein the locking arm of the turn plate is spring-loaded or is springy itself.

6. A car top carrier support as claimed in claim 1, wherein a bore is provided in each end of each one of said parallel tubes, a securing pin fastened at a steel wire cable or steel chain extends through said bore into the tube, the other end of the cable or chain being fastened in a theftproof manner at the frame or at another one of said securing pins, the securing pin has a slot or groove at its inner end portion, a locking plate cooperating with said slot or groove is movably arranged between a locking and an unlocking position within the tube and is spring loaded into one of its end positions, at least four Bowden cables are connected with each of said four locking plates respectively and wherein the four Bowden cables are connected with a common operating device.

7. A car top carrier support as claimed in claim 1, wherein the frame consists of at least one longitudinal main tube and at least a pair of cross tubes fastened at the ends of the main tube, the ends of each cross tube provided with non-circular cross-section form slide guides for detachable slide profiles, each slide profile has a bracket or support for fastening articles, a bore is provided in at least one wall of each end portion of each cross tube, a bore is provided in each slide profile, a securing pin extends from the outside through the pair of bores when aligned into the cross tube, the securing pin has a slot or groove at its inner end portion, a locking plate co-operating with said slot or groove is movably arranged between a locking and an unlocking position within the cross tube and is spring loaded into one of its end positions, at least four Bowden cables are connected with each of said four locking plates respectively and wherein the four Bowden cables are connected with a common operating device.

8. A car top carrier support as claimed in claim 6 or 7, wherein the four Bowden cables operating the locking plates in pairs are fastened at 180 degrees offset places at the turn plate in such a manner, that the locking plates are moved into their locking positions when the turn plate is pivoted to hold the pawl in its locking position.

9. A car top carrier support as claimed in claim 7, wherein the outer end of the securing pin in a theftproofed manner is connected with one end of a securing steel wire cable or steel chain, the other end of which being undetachably fastened at the slide profile or at another one of said securing pins.

10. A car top carrier support as claimed in claim 1, wherein the frame consists of one longitudinal main tube and a pair of cross-tubes and the main tube is fastened at the cross tubes eccentrically such that the cross tube portions on the one side of the main tube are shorter than those on the other side of which and wherein the longer cross tube portions consist of two parts connected with one another by a hinge joint.

* * * * *